Dec. 6, 1938.    H. RIESELER    2,139,284
COMBUSTION ENGINE
Filed Oct. 12, 1935    7 Sheets-Sheet 1

Inventor
Hermann Rieseler
by Maréchal & Noe
attys.

Dec. 6, 1938.  H. RIESELER  2,139,284
COMBUSTION ENGINE
Filed Oct. 12, 1935  7 Sheets-Sheet 2

Inventor
Hermann Rieseler
by Maréchal & Noe
attys

Dec. 6, 1938.  H. RIESELER  2,139,284
COMBUSTION ENGINE
Filed Oct. 12, 1935  7 Sheets-Sheet 3

Inventor
Hermann Rieseler
by Maréchal & Noe
attys

Dec. 6, 1938.   H. RIESELER   2,139,284
COMBUSTION ENGINE
Filed Oct. 12, 1935   7 Sheets-Sheet 4

INVENTOR
Hermann Rieseler
BY
Maréchal & Noé
ATTORNEY

Dec. 6, 1938.   H. RIESELER   2,139,284
COMBUSTION ENGINE
Filed Oct. 12, 1935   7 Sheets-Sheet 7

Patented Dec. 6, 1938

2,139,284

UNITED STATES PATENT OFFICE 2,139,284

COMBUSTION ENGINE

Hermann Rieseler, Kiel, Germany

Application October 12, 1935, Serial No. 44,662
In Germany November 22, 1932

3 Claims. (Cl. 60—44)

This invention relates to combustion engines.

One object of the invention is the provision of a novel combustion engine construction and method of operation thereof, which provides for wide variation in engine torque with a very economical fuel consumption.

Another object of the invention is the provision of an engine in which there is an exceptionally large temperature drop in the expansion of the hot products of combustion in an expansion chamber, to which the products of combustion are supplied through a pressure regulating intake valve which is provided between the expansion chamber and a preliminary combustion space in which the combustion originates.

Another object of the invention resides in an engine construction of the character mentioned in which the preliminary combustion space is cooled by combustion air furnished at high pressure from an air compressor which is independent of the work engine.

Another object of the invention is the provision of a combustion engine of the character mentioned, having provision for regulating the pressure of the compressed air which is supplied to the preliminary combustion space, enabling wide variations in torque of the work producing parts of the apparatus, the air compressor being driven independently of the work producing parts of the apparatus preferably by a separate combustion engine.

Another object of the invention is the provision of an engine having a work or expansion cylinder in which hot products of combustion are expanded and having a preliminary combustion space from which the hot products of combustion are supplied through a pressure regulating valve to the work cylinder, the compressed air flowing to the preliminary combustion space being passed along the walls of the gas conducting channel ahead of the intake valve of the work cylinder and along the walls of the preliminary combustion chamber so as to cool the walls and thus regulate the temperature of these walls to prevent them from becoming excessively hot, the heat applied to the compressed air being effective in bring the air temperature substantially up to the ignition temperature of the fuel introduced into the preliminary combustion space so that this heat is not lost in the work process of the engine.

Another object of the invention is the provision in an engine of the character mentioned, of a preliminary combustion chamber provided ahead of the work expansion chamber, so arranged as to give a very short flow path between the inlet valve and the expansion cylinder.

Another object of the invention is the provision, in a combustion engine of the character mentioned, of a valve governing the flow of hot combustion gases from the preliminary combustion chamber to the work or expansion chamber, the valve being so constructed as to automatically throttle the flow, providing increased throttling effect at increased speeds and thus automatically governing the torque of the engine by governing the degree of filling of the expansion chamber.

Further objects and advantages of the invention will be apparent from the following description, the appended claims and the accompanying drawings, in which—

Fig. 4a is a diagrammatic showing of an adjusting device according to Fig. 4 at a larger scale.

Figs. 4b, 4c, and 4d respectively are sectional views on the lines 4b—4b, 4c—4c, and 4d—4d, of Fig. 4a;

Figure 1:
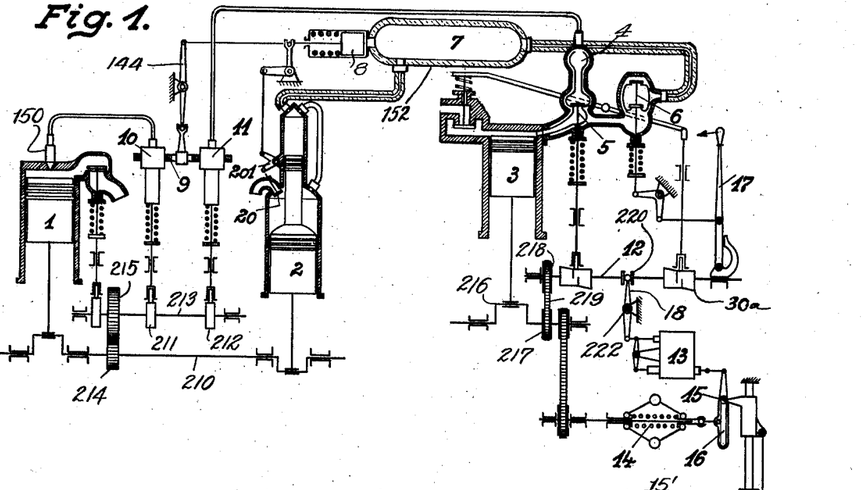
Fig. 1 is a diagrammatic representation of an engine or power plant embodying the present invention.

Referring more particularly to the drawings by reference numerals, and first with more particular reference to the power plant construction of Fig. 1, the invention as herein disclosed provides for the automatic regulation of the mean pressure of the gases supplied to the work cylinder in accordance with the speed of engine operation. The numeral 1 designates an engine such as a Diesel engine of any suitable character which is mechanically connected in driving relation with the air compressor 2, being coupled thereto in any desired manner. As illustrated, engine 1 and air compressor 2 have a common crankshaft 210. The air compressor supplies compressed air to a reservoir chamber 7 from which it flows, past the control valve 6, to the preliminary or combustion chamber 4 which is arranged ahead of the intake element or valve 5 of the work engine incorporating the piston and cylinder 3, in which the hot combustion gases are expanded, with the production of work.

As will be apparent from the drawings, the work or expansion chamber 3 and the preliminary or combustion chamber 4 is mechanically independent of any driving connection with the air compressor 2 and its driving motor 1.

A pressure regulating device 8 is provided, as shown, for the automatic control of the fuel supply device of the engine 1 and to control the fuel supplied to the combustion chamber 4 in accordance with the pressure of the air in the reservoir 7, the pressure regulator 8 thus keeping a substantially uniform air pressure in the reservoir 7. The regulator 8 controls the fuel regulating part 9 for the fuel pump 10 which governs the amount of fuel supplied to the fuel injection nozzle 150 of the engine 1. The fuel pump 10 is similar in construction to the fuel pump 11 and the two pumps, as shown, are controlled by a regulating rack 9 engaging gear teeth 140, see Fig. 12, that are provided on the reciprocating pump pistons. Lateral movement of rack 9 is controlled by a lever 144 connected to the regulator 8. The pump piston for the pump 11 is given reference numeral 141, this piston being operated by a fuel pump cam 212. The time duration of the supply of fuel oil to the pipe 143 is determined by the angular setting of the pump plunger. Such pump construction is well known, and shown for example in U. S. Patent 1,967,101. The pressure regulator is also mechanically connected to the air inlet valve 20 of the air compressor 2 so as to automatically control the amount of air drawn into the air compressor and thus governs the pressure of the air flowing from the smaller cylinder of the compound air compressor. If the pressure in reservoir 7 increases, angular lever 201 draws nearer to the shaft of inlet valve 20 and prevents a complete closing of the valve. In this form of construction, as will be noted, the fuel pump 11 which supplies fuel to the preliminary or combustion chamber 4 is driven from the same pump driving shaft which is utilized for the operation of the fuel pump of the engine 1. Thus, as illustrated, fuel pumps 10 and 11 are driven by cams 211 and 212 on camshaft 213, which is gear driven from crankshaft 210 by means of gears 214 and 215.

As will be more fully described, the fuel supplied to the combustion chamber 4 is burned with the warm compressed air supplied from the reservoir chamber 7, and the hot products of combustion or the burning gases are supplied to the expansion or work cylinder 3 under the control of a timed valve 5 which is driven in timed relation with the movements of the work piston 3 by means of a cam shaft 12 suitably geared or connected to the power-output shaft 216 to which the piston 3 is connected. As shown, power output shaft 216 carries sprocket 217 driving sprocket 218 on shaft 12 by means of chain 219. The cam shaft 12 also carries an outlet valve cam 30a for the control of the outlet or exhaust valve of the cylinder 3 which may be of any suitable and well-known construction, as shown.

The cam shaft 12, which preferably operates at the same speed as the crank shaft of the work cylinder, is shiftable endwise in order to change the stroke of the intake valve 5 and also to provide for reversal of engine operation, endwise movement of the shaft 12 being accomplished by means of a mechanical servomotor 13 of any suitable character. Thus, as illustrated, camshaft 12 carries collar 220, which is engaged by one end of lever 18 pivoted at 222. The other end of lever 18 is driven by servomotor 13. The servomotor is represented in Fig. 4a and its method of working described further below. The servomotor is controlled by means of centrifugal regulator 14 which automatically positions a lever 16 in accordance with the speed of operation of the work cylinder. The lever 16 is fulcrumed at a point 15 and the fulcrum point is movable along the length of the lever 16 in order to provide for reversal of the direction of engine operation. Shifting of the fulcrum 15 is accomplished by a manually controlled lever 15', as shown. Movement of this lever 15' from the position illustrated, in a clockwise direction, lowers the slidable fulcrum 15 to the other side of the point of pivotal connection between lever 16 and governor 14. With the fulcrum 15 in the position shown between the pivotal connection of governor 14 and the pivotal connection of servomotor 13 to lever 16, it is apparent that movement of governor 14 in one direction will produce movement of the connection of servomotor 13 in the opposite direction, with resultant movement of camshaft 12. When, however, fulcrum 15 is moved below the point of attachment of governor 14 to lever 16, movement of this point of attachment will result in a movement of the point of attachment of servomotor 13 in the same direction, and a corresponding movement of camshaft 12 is produced. Since camshaft 12 moves in accordance with the movements of the control member of the servomotor, as explained below, it follows that reversing the movement of the control member will result in reverse movement of camshaft 12. 17 is a manually controlled lever, fulcrumed adjacent its lower end at a fixed axis, and movable in the direction of the arrow, or counterclockwise, to open the valve 6 to the desired extent to provide for the supply of air from reservoir 7 at a controlled rate. For any position of the hand lever 17 the valve 6 is set at some predetermined position determining the engine performance by determining the mean pressure of the air admitted to the combustion chamber 4 at any speed. The centrifugal regulator 14 controls the engine performance automatically by automatically changing the torque to maintain any selected speed. Thus a considerable variation in the engine torque produced by the work cylinder construction is provided for, qualifying the work cylinder for uses in many places in place of the steam engine with its customary boiler. The engine operation of the present invention, however, is far superior in many respects to the ordinary engine and boiler construction as it gives a very wide variation of engine torque with a large temperature differential between the gas supplied to the expansion chamber and that which exhausts to atmosphere.

In accordance with the construction of Fig. 1 of the drawings the products of combustion produced in the combustion chamber 4 are of very high temperature and of high pressure. The air supplied from the reservoir 7 is also of high pressure, in excess of the pressure produced in the combustion chamber when the fuel is burned at that point. The air supply from the reservoir chamber 7 is also quite warm as it has been heated up by reason of its compression in the air compressor 2, and its heat is maintained by a suitable heat insulation covering 152 provided for the reservoir 7 and for the air pipes leading therefrom. This warm air supplied from the reservoir chamber 7 flows through the valve 6 and is then supplied up along the sides of the reservoir chamber 4 which is spaced some little distance from the outer walls as shown diagrammatically in Fig. 1 and as more fully illustrated in Fig. 7. As the warm air supplied from the compressor 7 flows along the hot walls of the combustion chamber 4 the air is further heated to such a point that at the particular pressure at which it is supplied it will cause the ignition of the fuel supplied from the fuel pump 11 to the combustion chamber. The combustion of the fuel in this air serves to maintain the walls of the chamber 4 heated but as previously mentioned an excessively high temperature of these walls is prevented by the flow of air around them.

As already mentioned, the air compressor 2 is operated without any mechanical driving interconnections with the work cylinder 3 so that when any additional torque is required of the work cylinder 3, when the latter tends to slow down in its operation, the pressure of the gas supplied to the reservoir 7 can be maintained automatically by the regulator 8, and by moving the lever 17 to increase the opening of the valve 6, or by automatic operation of the centrifugal governor 14 the cam shaft 12 can be so regulated to produce a wider opening, and consequently less throttling in the flow of combustion gases from the combustion chamber 4 to the expansion chamber 3. As shown particularly in Figs. 4a, 4b, 4c and 4d, where a detailed showing is given of the means for regulating the endwise movement of the cam shaft, as will be later described, the shifting of the cam shaft produces a change in the lift of valve 5, due to the configuration of the cams, as shown particularly in the sectional views 4b, 4c and 4d. Thus as the shifting of shaft 12 brings a higher part of the cam under the operating mechanism of valve 5, the lift of the valve is increased. The mean effective pressure of the work chamber is therefore controllable.

It will now be apparent that the combustion products generator or chamber 4 is supplied with compressed air and with fuel oil, the compressed air stream being heated to such a point by passing in contact with the hot walls of that chamber as to be at the ignition temperature when it reaches the atomized fuel stream. The burning takes place in the chamber 4, the hot products of combustion being then immediately supplied to the expansion chamber, before the heat contained in the gases is dissipated by radiation and lost. The valve 5 is opened when the piston 3 is at or near its top dead center position and the hot products of combustion and burning gases are supplied to the expansion chamber during the time of fuel supply to the chamber 4. Moreover the degree of opening of the valve 5 can be controlled so as to open wider, if more torque is desired, or vice versa and when the torque requirement is increased there is also a greater amount of fuel supplied to the combustion chamber 4, and there is a greater flow of air from the reservoir 7. This creates a greater drain on the air reservoir, but as there is a separate source of power for operating the air compressor the latter can supply an increased amount of air at a time of increased torque, and can maintain operation under the increased torque requirements as long as desired. The torque output may thus be very widely varied.

Figure 2:
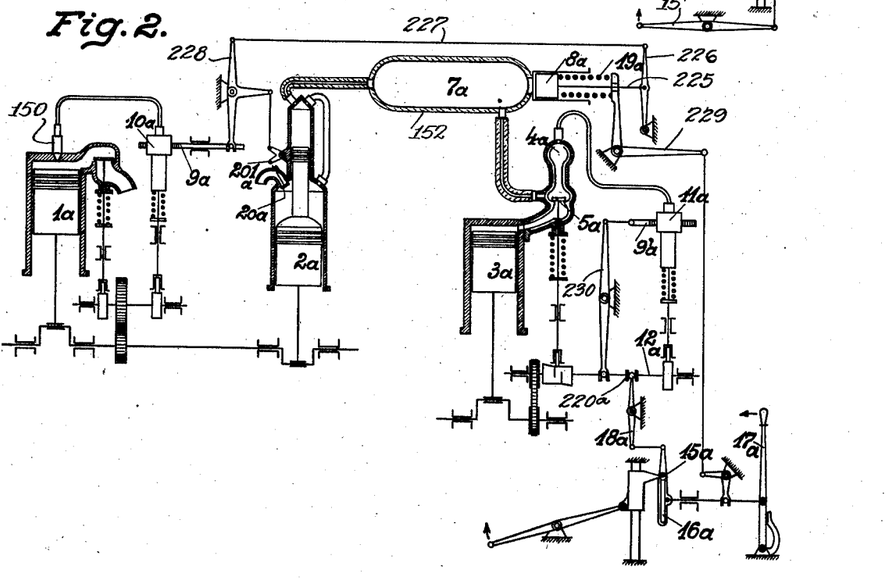
Fig. 2 is a diagrammatic view of a slightly modified form of construction providing for manual control of the compressed air reservoir pressure.

Fig. 2 shows a slightly modified form of construction, corresponding in many respects to the construction shown in Fig. 1. In Fig. 2, the Diesel engine 1a operates the separate air compressor 2a which supplies air to the work or expansion cylinder 3a, the air being mixed with the fuel in the combustion chamber 4a and the hot products of combustion from the combustion chamber 4a being supplied through the valve 5a to the expansion cylinder 3a as in the form of construction first described. A manually controlled valve such as the valve 6 of Fig. 1 is not employed, the air reservoir chamber 7a being connected directly to the combustion chamber 4a. The pressure of the air in the reservoir chamber 7a can be varied, however, to provide for different torque requirements of the engine. As herein shown the pressure regulator 8a comprises a pressure responsive element connected to a control lever which is connected in turn to the fuel control part 9a which controls the fuel pump 10a of the driving Diesel engine 1a. As illustrated, the pressure response element of pressure regulator 8a is connected by rod 225 to lever 226, which is in turn connected by rod 227 to three-armed lever 228. Lever 228 is connected to the control part 9a of fuel pump 10a, and to valve 20a. The pressure of the air within the reservoir chamber 7a balances the pressure responsive element against a spring 19a, the latter being adjustably controlled by means of a ball-crank lever 229 or the like connected to an operating lever 17a which is manually adjustable to cause any predetermined desired air pressure in the chamber 7a. Operating lever 17a can be moved counterclockwise. Such movement produces an endwise movement of cam shaft 12a, by the operation of lever 16a, lever 18a, and associated connections, the upper end of lever 18a engaging collar 220a on cam shaft 12a. Endwise movement of cam shaft 12a increases the lift of valve 5a, and also serves to increase the output of fuel pump 11a. Control part 9'a of the fuel pump is connected to one end of lever 230, the other end of the lever being connected to cam shaft 12a. Movement of lever 17a also serves to compress spring 19a, through the medium of bell crank 229 and associated linkage. This produces movement of the pressure responsive element of regulator 8a, if the tension of spring 19a is increased to a point in excess of the pressure of the air in reservoir 7a. Such movement in turn increases the output of air compressor 2a through the mechanism previously described. Thus regulator part 9a moves to increase the output of fuel pump 10a, and lever 201a is withdrawn to allow valve 20a to function. Pressure in chamber 7a thus increases until the tension of spring 19a in its new position is balanced.

As the hand lever 17a is adjusted to determine the pressure to be maintained in the reservoir 7a, it also controls the setting of the cam shaft 12a which is operated through lever 18a connected to lever 16a which is fulcrumed at 15a on a manually adjustable fulcrum which can be moved down to the lower end of the lever 16a in order to provide for reverse operation of the engine. As will be noted, the cam shaft 12a also drives the pump plunger of fuel pump 11a which supplies fuel to the combustion chamber 4a whereas in the form of construction first described the fuel pump is operated from a shaft of the compressor driving Diesel engine 1a. The operation of the fuel pump 11a is controlled in accordance with the setting of the cam shaft 12a and in accordance with the setting of the spring 19a so that the quantity of fuel, supplied continuously or periodically at predetermined times in the sequence of operations of the work cylinder, is changed in accordance with the requirements, for the control of engine torque.

If the operating lever 17a is moved as indicated by the arrow, the stroke of the intake valve 5a is increased, increasing the flow to the work chamber and providing for increased torque, and at the same time the regulating member for the fuel pumps 10a and 11a is changed so as to increase the fuel quantity delivered to the combustion chamber 4a and to engine 1a. This occurs while the control regulator 20a of the air compressor is changed so as to provide for an increased pressure out-put to the air reservoir chamber 7a.

Figure 3:
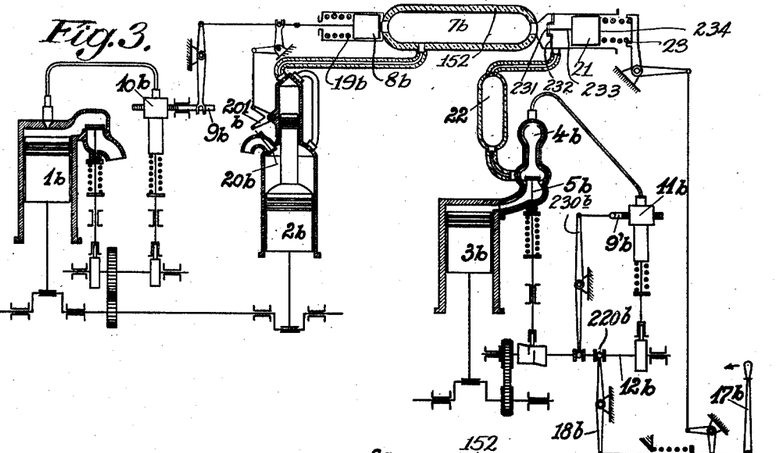
Fig. 3 is a diagrammatic view of another modification of the invention in which a slightly different form of control is provided for the regulation of the pressure of the compressed air reservoir chamber.
Figures 5, 8, 12, 13:
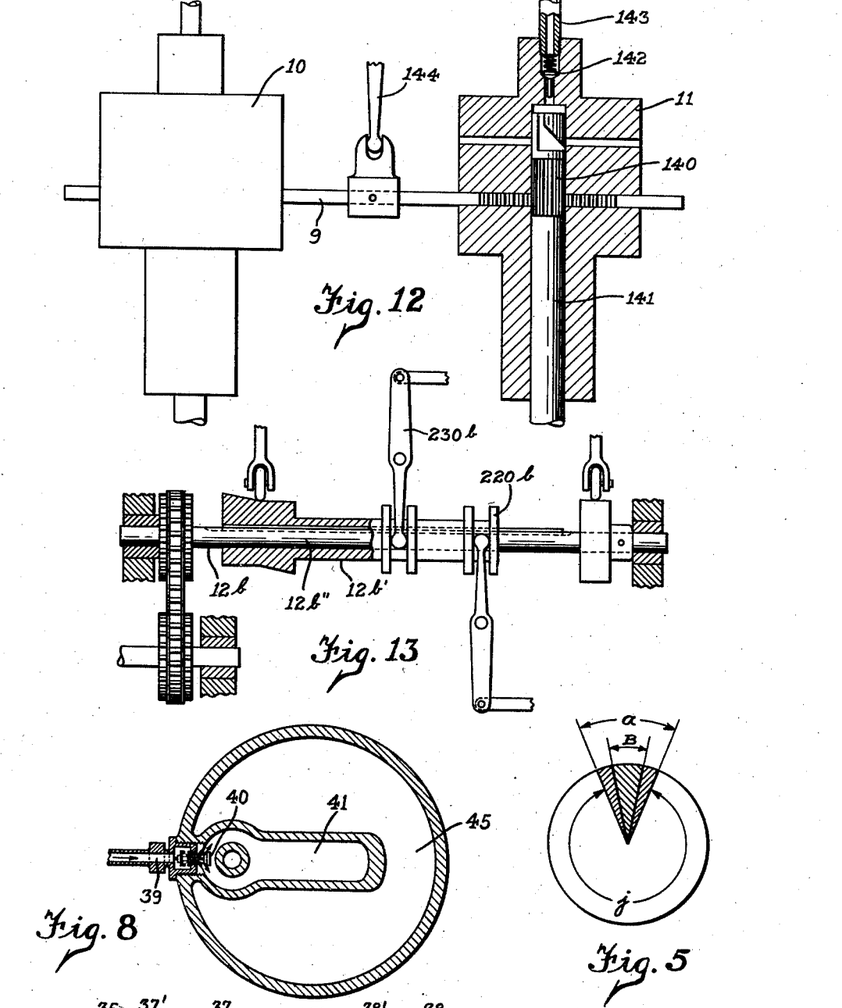
Fig. 5 is a diagrammatic showing of the timing of the fuel injection and inlet valves of a cylinder of the engine represented in Fig. 6.
Fig. 8 is a section on the line 8—8 of Fig. 7.
Fig. 12 is an enlarged showing of one of the fuel pumps.
Fig. 13 is a longitudinal section on shaft 12b of Fig. 3, taken vertically.

In the construction shown in Fig. 3 there is a further modified form of the invention. Here the Diesel engine 1b drives the air compressor 2b which is independent of any mechanical driving connection or timed operation with the work or expansion cylinder 3b. The combustion chamber 4b is periodically supplied with fuel from a fuel pump 11b driven from cam shaft 12b. The amount of fuel supplied at each operation of the pump is controlled by a control part 9'b which is adjustable in accordance with the position of the hand lever 17b which also operates the endwise adjustable cam shaft 12b for the control of the operation of the inlet valve 5b. As shown, control part 9'b is in the form of a rack which, at its lateral movement, turns the pump piston to regulate the fuel quantity, as described in connection with Fig. 1. Control part 9'b is adjusted upon endwise movement of the cam shaft through the intermediation of lever 230b. Fig. 13 shows one arrangement by which a portion of the cam shaft which carries the cam controlling the valve 5b may be given endwise movement under the control of the lever 17b, while rotatably connected to its driving gear. This axially movable portion 12b' is keyed to the spindle portion 12b'' which rotates on suitable bearings to rotate the movable portion. The movable portion is moved axially by an operating lever engaging the collar 220b. The air supply to the air reservoir 7b is automatically maintained at some predetermined pressure by means of the pressure regulator 8b which automatically operates against the tension of a spring 19b balancing against the pressure of the air in the reservoir chamber. This pressure regulator controls the fuel pump control part 9b automatically, which controls the operation of the fuel pump 10b and which also controls the operation of the air inlet valve 20b of the air compressor. Air from the air reservoir 7b is supplied through an automatically controlled valve 21 which provides for a controlled throttling of the air flow from the reservoir chamber 7b to the auxiliary reservoir chamber 22 in accordance with the setting of lever 17b. The pressure valve 21 is automatically controlled by a spring 23 one end of which is adjustably positioned by means of a manual lever 17b. As shown, valve 21 comprises valve head 231 movable toward and away from valve seat 232. Head 231 is connected by stem 233 to pressure responsive element 234, so that compressed air from reservoir 7b tends to move the valve to the right. Adjustable spring 23 urges element 234 to the left against the action of the air. Increasing the tension on spring 23 thus varies the amount of air supplied to auxiliary reservoir 22. The latter is also connected to the endwise adjustable cam shaft 12b which controls the lift of inlet valve 5b. Lever 17b is also mechanically connected to the control part 9'b of the fuel pump 11b.

In this form of construction the pressure of the air supplied to the combustion chamber 4b can be manually varied by adjustment of the setting of lever 17b although the pressure of the air in the reservoir chamber is maintained substantially uniform, the pressure reducing valve 21 provided ahead of the auxiliary small compressed air container 22 providing for such pressure control. These parts provide for taking up the volumetric increase of the gases due to combustion in space 4b by equalizing the pressure between chamber 22 and space 4b, or by providing an automatic check against flow from chamber 22 to reservoir 7b. The pressure in the expansion chamber may be increased by shifting the cam shaft 12b to cause a larger opening of the intake valve 5b, and while this occurs the regulating member 9'b of the fuel pump 11b increases the fuel supplied directly to the combustion chamber 4b.

In this construction the auxiliary container 22 and its supply and delivery pipes, like the container or reservoir 7b are provided with a heat insulating covering as a protection against heat losses, it being understood that such heat insulation is provided in the various other embodiments of the invention.

In the form of construction shown in Fig. 4 the power plant comprises the air compressor 2c driven by the engine 1c, the parts 8c, 19c, 20c, 9c and 10c corresponding substantially to the parts of corresponding numbers discussed with reference to Figs. 1, 2 and 3. The air reservoir chamber 7c, however, is connected directly to the combustion chamber 4c which supplies hot combustion gases to the expansion chamber 3c under the control of the mean pressure regulating valve 5c operated by means of the movable cam shaft 12c. The latter is positioned by a control lever 17c which operates the lever 16c fulcrumed at 15c and connected to a servomotor 13c which in turn is connected to the cam shaft 12c and also to the fuel pump control part 9c and the fuel pump 11c. The servomotor 13c is operated by air pressure by reason of the air pipe connection 151 to the air reservoir 7c, as shown. It is understood that the servomotor 13c may be of any suitable character to provide for adjustment of the setting of the cam shaft 12c by power supplied from the air pressure, under the control of a valve which itself is worked from the lever 16c. Fig. 4a represents this servomotor in a larger scale; the method of working of such a servomotor is generally known. The inner slide valve 131 is actuated by control lever 17c. The inlet ports 237 and 238 to the cylinder of the servomotor are controlled by the two inner collars 132, 133 of the distribution slide valve 131, whereas the two outside collars 134, 135 control the outlet ports 239 and 240 from the cylinder. In the position shown fluid under pressure enters port 238 and acts upon piston 241 to move it to the left. At the same time the space to the left of piston 241 is open to atmosphere through port 239 and holes 242 in sleeve valve 137. For reverse operation, pressure is applied through port 237 to the left side of piston 241, and the space to the right of the piston is in communication with atmosphere through port 240 and hole 243 in sleeve valve 137. Return sleeve valve 137 is coupled to the piston rod 136 of the servomotor by coupling means 236; this sleeve valve again closes the inlet and outlet channels after each displacement of distribution valve 131. Therefore, each position of the distribution valve 131 corresponds to an exactly fixed position of the servomotor piston and the valve camshaft 12c. The construction is such that shifting of the shaft 12c does not alter the driving of the fuel pump plunger. The construction of shaft 12c preferably comprises an axially movable portion keyed on a rotatable spindle portion similar to the shaft 12b previously described. Consequently, the stroke of the inlet valve can be minutely adjusted or modified without force by control lever 17c. As in the other modifications, the fulcrum 15c may be moved to the lower end of the lever 16c to provide for reverse operation of the engine so that the lever 17c may be moved in the same direction to increase the engine torque regardless of which direction the engine is operating. In this form of construction there is an approximately uniform high pressure in the air supply line connected to the combustion chamber 4c.

Figure 6:
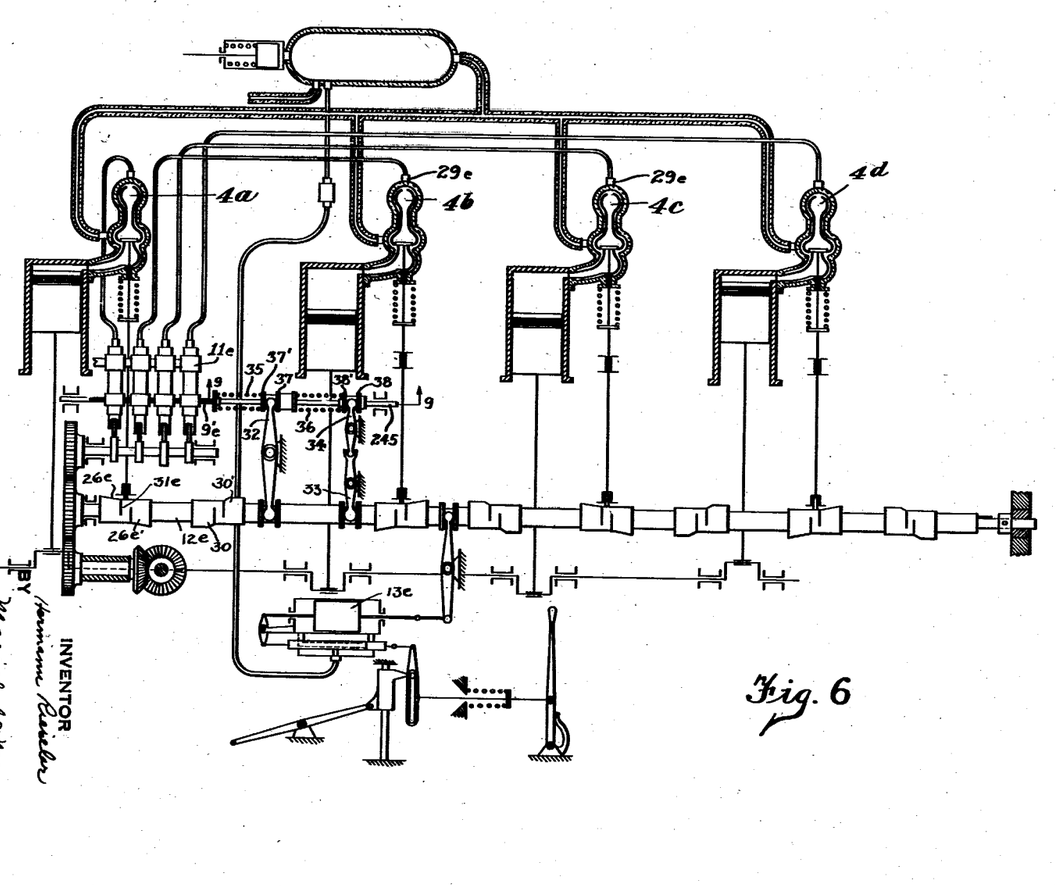
Fig. 6 is a diagrammatic showing of a portion of the elements of a power plant embodying the present invention in which an individual fuel injection chamber is provided for each work or expansion chamber of the engine.

In the forms of construction illustrated in Figs. 1 to 4 inclusive, the expansion chamber or work cylinder 3, 3a, 3b, or 3c may be a single cylinder or may be a multiple number of cylinders, and the combustion chamber 4, 4a, 4b or 4c may also be a single combustion chamber or may be several combustion chambers, as desired. Fig. 6 shows a modification of the invention, corresponding substantially to the constructions previously described, but incorporating a construction adapted for a plurality of work cylinders.

In the construction shown in Fig. 6, there are four fuel injection nozzles 29e corresponding to four combustion chambers 4, 4a, 4b or 4c, constructed in accordance with the construction set forth in Figs. 1 to 4 inclusive. The fuel is supplied to the four fuel nozzles 29e by means of four fuel pumps 11e, the amount of fuel supplied being governed by a controlled part 9'e that can be moved in one direction to increase the amount of fuel and moved in the other direction to decrease the amount of fuel supply regardless of which direction the engine is operating. As herein shown the endwise adjustable control shaft 12e is positioned by means of a regulator 13e corresponding to the regulator 13c illustrated in Fig. 4 for example. This controls the duration of the injection period or the amount of fuel injected, for any setting of the cam shaft 12e, by turning the pump plunger simultaneously by means of the rack teeth on the control part 9'e. The cam shaft 12e is provided with intake valve actuating cams 26e for forward operation of the engine and 26'e for reverse running and is provided with exhaust valve actuating cams 30 and 30' for forward and reverse running. The rollers provided at the lower ends of the valve lifting rods cooperate with the inclined surfaces of the valve actuating cams 26e so that the intake valve will be open to a greater extent when operating adjacent end portions of the cam 26e, and to a lesser or to a zero extent when operating close to the center or between the cams 26e and 26'e. The valve stroke of the exhaust valve preferably remains constant when the stroke of the inlet valve is changed.

In this form of construction endwise adjustment of the cam shaft 12e is transmitted to the regulating element 9'e through three double levers 32, 33 and 34. Movement of the cam shaft 12e toward the right operates through lever 32 merely to compress spring 35, since the spring 37' is slidable on rod 245, formed as an extension of rack 9'e, levers 33 and 34 serving to positively move the fuel pump control part 9'e towards the right, since the flanged collar 38 is fast on rod 245. The part 9'e is moved to the right, however, even when the cam shaft 12e is moved to the left, because when that takes place the lever 32 positively moves the part 9'e by engagement with flanged collar 37 which is fast on the rod 245. Levers 33 and 34 operate merely to compress the spring 36 through spring plate 38' slidable on rod 245, and are ineffective. Thus regardless of the position of the adjustment of the cam shaft 12e, either for forward or reverse running of the engine, movement of the shaft in one direction such as will move the cam roller from a point corresponding to minimum opening of the inlet valve 5, 5a, 5b or 5c will produce a movement of the fuel pump control part 9'e such as to cause an increase in the fuel quantity supply.

Fig. 5 represents the timing of the fuel injection and of the opening and closing of the valve 5, 5a, 5b or 5c, for the construction illustrated in Fig. 6. Here the time during which the valve 5, 5a, 5b or 5c of any cylinder is closed, as represented by angle $j$, is quite long as compared to the time the gas is flowing past the valve inasmuch as the valve for each cylinder controls the flow of hot gases generated from one injector means. In this figure the angle $\alpha$ represents the time and duration of the opening of an inlet valve and the smaller angle β represents the duration of fuel injection at a fuel nozzle.

Figure 7:
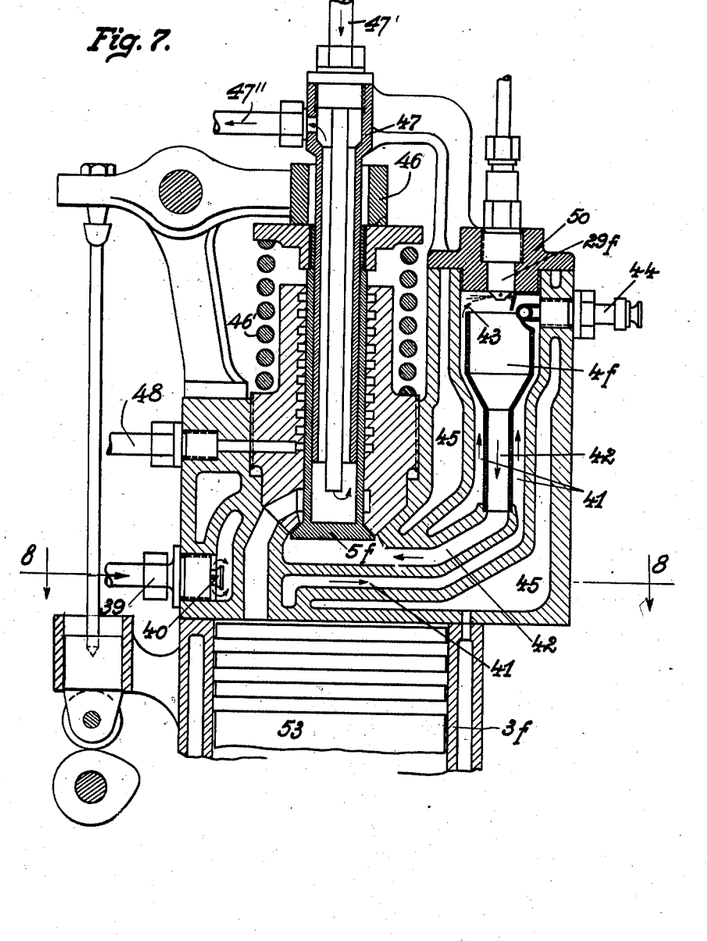
Fig. 7 is a vertical section taken centrally through a work or expansion cylinder and showing the inlet valve and preliminary combustion chamber.
Figure 9:
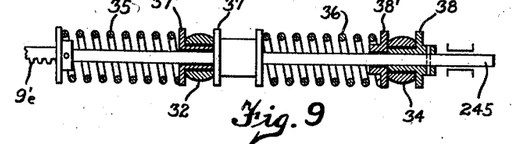
Fig. 9 is a sectional view on the line 9—9 of Fig. 6.

Fig. 7 shows a preferred form of construction of the combustion chamber and of the air and fuel conduits and passages provided ahead of the expansion chamber of any of the modifications of the invention described. In the description of the construction of Fig. 7 the same reference numerals have been employed to designate corresponding parts of the other modifications, although a different suffix letter is used. The work cylinder or expansion chamber is represented by the reference numeral 3f, 53 designating the work piston. The hot products of combustion are supplied to the work cylinder through the valve 5f, which is operated by the fork 46 of a cam control member as will be later described. The fuel which is supplied as an oil stream to the fuel injection nozzle 29f is injected into the combustion space 4f. The compressed air from the air compressor enters through the pipe line 39 at approximately the temperature of the air in the last stage of the multiple stage compressor. Where the burning in the combustion chamber 4f occurs intermittently or at different predetermined times in the sequence of each cycle of operation of the work cylinders, and where the volumetric increase occurring during combustion is utilized to increase the pressure of the combustion gases ahead of the intake valve 5f, then the warm compressed air passes first through an automatic check valve 40 which prevents the return of air back through the pipe line 39. The air then enters the air passage 41 which extends around the passage provided for the hot products of combustion, to which the reference numeral 42 has been applied. In flowing along the passage 41 the walls of the passage 42 are cooled, and the compressed air is heated up very materially so as to be at least as hot as the ignition temperature of the fuel in the chamber 4f. The walls of the passage 42 are hot enough, however, to provide automatically for the ignition of the fuel at the prevailing temperature as the fuel enters the combustion chamber 4f. After being heated, the heated compressed air enters the top of the combustion chamber 4f radially and from different sides, flowing generally towards the fuel injection nozzle 29f from which the fuel is directed in radially outward streams and at high speed. The outwardly directed fuel therefore meets the inwardly directed air streams at relatively high velocity so as to produce a thorough atomization of the fuel and an intimate contact of the fuel particles with the oxygen molecules that are unusually close together by reason of the high pressure prevailing. This gives such a thorough mixing as to produce complete combustion of the fuel. The maximum combustion temperature of the fuel is extremely high due to the fact that the temperature of the combustion air supplied to the combustion chamber 4f is quite high.

To provide for ready starting of the power plant, when cold, ignition of the fuel in the combustion chamber 4f is obtained by means of a glow plug 44, arranged in a side of the combustion chamber and adapted to be electrically energized at low voltage to produce a glowing temperature of the heating element which, if desired, may be arranged in a small antichamber of the combustion chamber near the fuel entrance, as shown.

The outer wall of the air passage 41 is surrounded by a heat protective chamber 45 which, as illustrated in Fig. 7, is in communication with the water cooling jacket of the cylinder 3f. The chamber 45 may be filled with cooling water, or may contain dead air or other heat insulating material. The heat transmitted through the wall enclosing the air passage 41 is thus quite restricted, if dead air or other heat insulating material is employed, so that little heat is lost. The heat transmitted to the compressed air itself while passing through the passage 41 is utilized in the work process in the form of energy.

The combustion chamber 4f and the various air passages are arranged, as shown, in a head or housing constituting the head of the cylinder 3f and providing a short passage of small volume between the valve 5f and the expansion chamber 3f so that the volume of gas required to fill this passage is quite restricted. This housing is provided with a detachable portion 50 that can be removed for inspection of the incandescent starting plug 44 and for inspection of the readily removable combustion chamber walls including the combustion gas passage 42. The housing of the combustion chamber is also provided with a recess in which is removably threaded the guide portion of the inlet valve 5f. The latter is reciprocated in the guide portion by means of the fork 46 of a cam operated member, which controls the opening of the valve 5f against the tension of a compression spring 46'. The upwardly extending portion of the valve 5f is stationary, held so by the hollow stems or pipes 47' and 47", and a suitable supporting bracket, the valve being supplied with cooling liquid such as cooling water supplied under pressure for entry through a hollow stem 47' leading through the stationary portion 47, the cooling water being taken off through an outlet pipe 47" connected to a side of this valve portion 47. To lubricate the intake valve 5f and the stationary valve portion 47 an oil conduit 48 is provided, connected to an oil supply reservoir, not shown, which supplies oil under suitable pressure.

Figure 10:
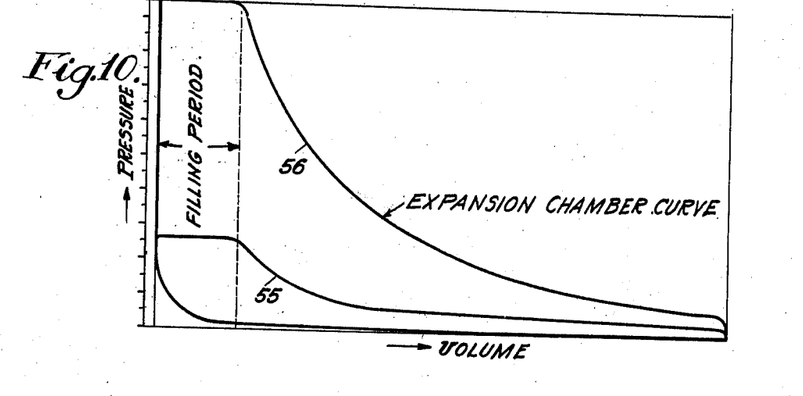
Fig. 10 is a diagrammatic view of two pressure volume diagrams of the engine of the present invention as illustrated in the construction shown in Figs. 2 and 3 for example, and in which the intake pressures differs at an approximately constant filling period.

Fig. 10 illustrates the pressure volume curve of the work or expansion chamber of an engine constructed in accordance with the modifications shown in Figs. 2 and 3, and in which the engine operates at a variable intake pressure but with a uniform comparatively short filling period. During forward operation of the engine at high speed, the pressure of the hot combustion gases exerted on the piston changes approximately in accordance with the line 55. When the load increases the speed tends to decrease and this automatically increases the intake pressure of the compressed air if necessary up to about 100 kilograms per square centimeter to provide a pressure volume curve in accordance with the curve represented by the line 56, in which the base line represents normal atmospheric pressure.

As compared with the known engine constructions in which wide variations in torque are possible, such for example as a steam engine, the power plant of the present invention has the advantage in that it operates with a comparatively short filling period, represented in Fig. 10 by the distance between the vertical solid line at the left-hand of the diagram curve and the vertical dash line. The present construction therefore provides for correspondingly low exhaust pressures and extremely low exhaust gas temperatures, thus minimizing the exhaust gas loss even when the torque requirements are considerably high.

Figure 4:
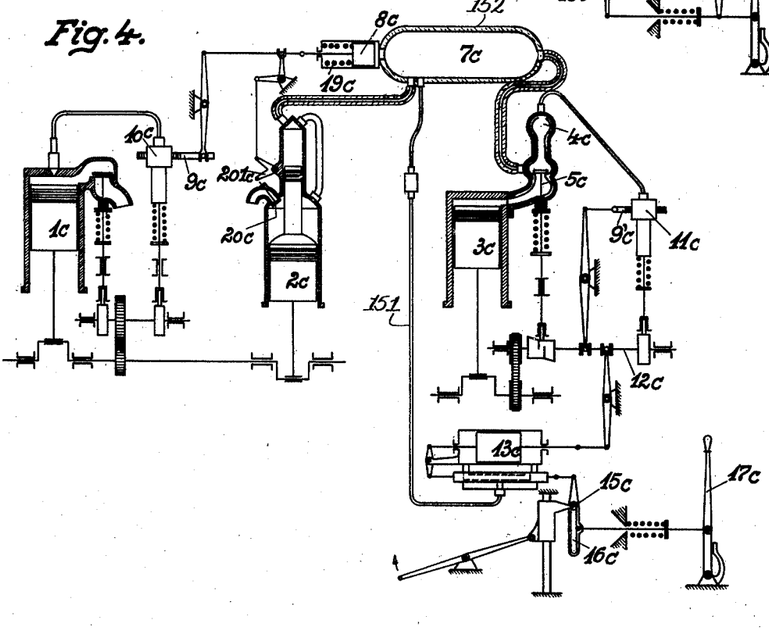
Fig. 4 is a diagrammatic showing of another modification of the engine in which manual adjustments of different controlled elements are effected through a servomotor which is operated by air supplied from the compressed air reservoir.
Figures 4A, 4B, 4C, 4D:
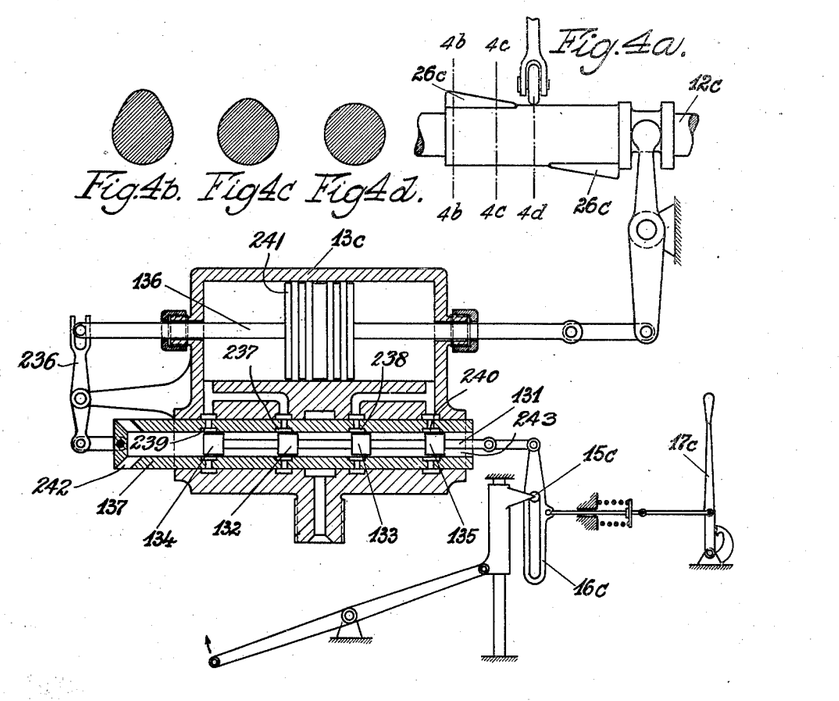
Figure 11:
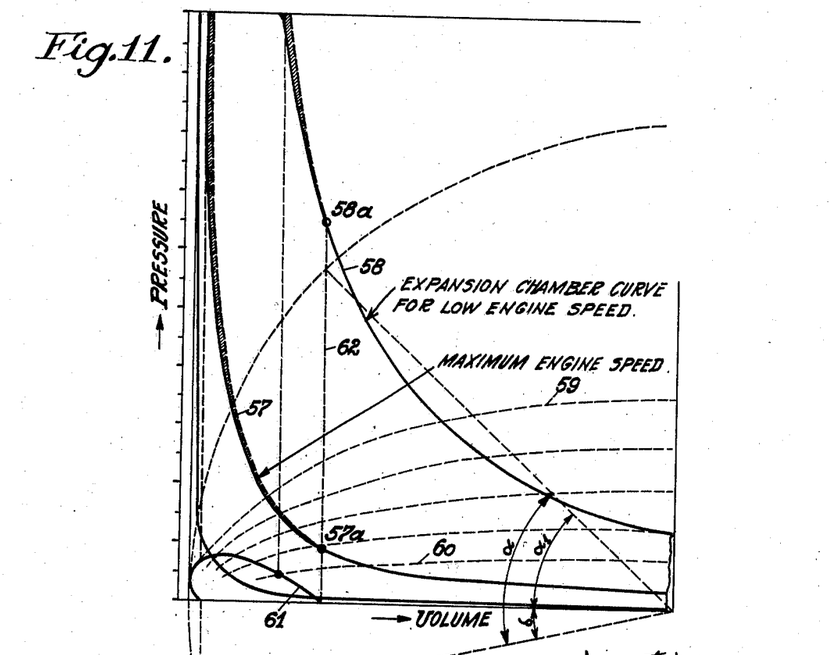
Fig. 11 is a diagrammatic showing of pressure volume diagrams of the engine of the present invention, corresponding for example to the construction shown in Figs. 1 and 4, and in which there is an approximately uniform pressure of combustion gases supplied to the expansion chamber, and showing the results of throttling of the flow to the expansion chamber at different speeds of operation.

Fig. 11 represents the left-hand end of the pressure volume diagram of the power plant represented in Figs. 1 and 4. In these modifications the engine operates with substantially constant maximum intake pressure, and the angular duration of time, angle α, during which the intake valve 5, 5a, 5b or 5c is open is substantially constant. The crank angle α1 measuring from the outer piston dead center position to the time of closing of the intake valve 5, 5a, 5b or 5c is indicated in this diagram Fig. 11, this angle being the difference between angle α and the pre-intake angle δ or angle ahead of dead center. The engine operates with a varying filling or charge of the work cylinder at different speeds, because here there is an intentional throttling of the combustion gases flowing to the work chamber 3, 3a, 3b or 3c in order to automatically reduce the time of filling at the higher operating speeds. The energy transmission through the intake valve 5, 5a, 5b or 5c is automatically throttled to change the mean pressure of the combustion gases supplied to the work chamber at any speed, and this gives an automatic control of the torque at different speeds. This especially adapts the construction to a power plant suitable for driving an automatic vehicle or the like where the power requirements differ widely at different times and where the torque requirements are quite large at lower speeds.

As shown in the diagram of Fig. 11 the pressure curve 57 corresponds to maximum speed conditions, the pressure curve 58 corresponding to a lower engine speed. This diagram furthermore shows other curves in dash lines, such as the line 59, indicating the speed of flow of the products of combustion through the intake valve 5, 5a, 5b or 5c at the maximum engine speed, curve 60 indicating the speed of gas flow at a low engine speed corresponding to the increased engine torque of full engine performance. The additional dash lines shown between curves 59 and 60 represent the speed of flow of the products of combustion at other engine speeds between the maximum and minimum. The solid line 61 represents the valve opening curve for the intake valve 5, 5a, 5b or 5c at its maximum stroke. From the intersecting points of the curves 59 or 60 or of the other curves lying between curves 59 and 60,—with the valve curve 61, the time of starting the automatic throttling action can be readily calculated. This throttling action is indicated by the sectioned deviation from the solid line of the pressure volume diagram on which the calculations are based. The intersecting points of the vertical line 62 designating the time of valve closure with the pressure lines 57 and 58, as represented by points 57a and 58a, indicate the pressure of the combustion gases at the time of the closing of the intake valve 5, 5a, 5b or 5c. The degree of the automatic throttling action changes up to the time the valve is closed. This throttling action provides an automatic change in the engine torque in accordance with the speed of operation, as the full pressure of the combustion gases in chamber 4, 4a, 4b or 4c is applied to the expansion chamber for only a part of the time the valve 5, 5a, 5b or 5c is open. The valve closing line 62 of the diagram represents a charge time of about 14% of a stroke of the work piston. The theoretical pressure curve 57 corresponds to high speed operation in which there is a filling of about 1.5% of the total piston stroke during which the maximum pressure is supplied. Curve 58 corresponds to a theoretical pressure volume diagram in which there is a charging at maximum pressure only during about 10% of the piston stroke. As can be noted the effect of the automatic throttling due to the limited opening travel of valve 5, 5a, 5b or 5c is much greater, in proportion, during high speed operation.

As will now be apparent, the engine operates with unusually small charging time during which fuel and air are supplied to the work chamber, and with low final pressures of the exhaust and with correspondingly low exhaust gas temperatures and small gas losses. As will also be apparent the engine of the present invention operates with widely varying torque and with an unusually large differential between the high temperature of the charging gas, and the temperature of the exhaust, resulting in unusual economy.

While the method herein described and the forms of apparatus for carrying this method into effect, constitute preferred embodiments of the invention, it is to be understood that the invention is not limited to this precise method and forms of apparatus, and that changes may be made in either without departing from the scope of the invention which is defined in the appended claims.

What is claimed is:

1. A combustion engine of the character described comprising a gas expansion chamber having a movable work member, a combustion chamber in which combustion gases are produced sufficient for the power operation of said movable work member, said combustion chamber being fixed in close proximity to the expansion chamber, supply means of short length extending directly from the combustion chamber to the expansion chamber and having a valve operable to vary the flow of combustion gases supplied to the expansion chamber, an air compressor, an auxiliary engine for operating said compressor, said auxiliary engine being independent of any energy drain on the combustion chamber, means for controlling the output of said auxiliary engine, a passage in heat conducting communication with and extending around said combustion chamber and having a discharge opening communicating with the combustion chamber, means for supplying compressed air from said compressor to said passage at a point remote from said discharge opening to heat the air and cool the combustion chamber, means for periodically injecting fuel to the combustion chamber in the normal operation of the combustion engine, means for operating said valve in timed relation to the movements of said movable work member to open the valve before the time of fuel injection to the combustion chamber, and means for controlling the weight of combustion gases supplied per cycle of operation of the work member.

2. A combustion engine of the character described comprising a gas expansion chamber having a movable work member, a combustion chamber in which combustion gases are produced sufficient for the power operation of said movable work member, said combustion chamber being fixed in close proximity to the expansion chamber, supply means of short length extending directly from the combustion chamber to the expansion chamber and having a valve operable to vary the flow of combustion gases supplied to the expansion chamber, an air compressor, an auxiliary engine for operating said compressor, said auxiliary engine being independent of any energy drain on the combustion chamber, means for controlling the output of said auxiliary engine, a passage in heat conducting communication with and extending around said combustion chamber and having a discharge opening communicating with the combustion chamber, means for supplying compressed air from said compressor to said passage at a point remote from said discharge opening to heat the air and cool the combustion chamber, means for supplying fuel to the combustion chamber in timed relation to the movements of said movable work member and during the normal operation of the combustion engine, means for opening and closing said valve in timed relation to the movements of said movable work member said means operating to open the valve before the time of fuel supply to the combustion chamber, and means for controlling said valve to vary the amount of combustion gases supplied per cycle of operation of the movable work member.

3. A combustion engine of the character described comprising a gas expansion chamber having a movable work member, a combustion chamber in which combustion gases are produced sufficient for the power operation of said movable work member, said combustion chamber being fixed in close proximity to the expansion chamber, supply means of short length extending directly from the combustion chamber to the expansion chamber and having a valve operable to vary the flow of combustion gases supplied to the expansion chamber, an air compressor, an auxiliary engine for operating said compressor, said auxiliary engine being independent of any energy drain on the combustion chamber, means for controlling the output of said auxiliary engine, a passage in heat conducting communication with and extending around said combustion chamber and having a discharge opening communicating with the combustion chamber, means for supplying compressed air from said compressor to said passage at a point remote from said discharge opening to heat the air and cool the combustion chamber, means for supplying fuel to the combustion chamber in the normal operation of the combustion engine, valve operating means controlling the opening and closing of said valve in timed relation to the movements of said movable work member, control means for controlling said valve operating means to vary the amount of combustion gases supplied per cycle of operation of said movable work member and to vary the direction of rotation of the engine, a fuel regulating member for controlling the amount of fuel supplied to the combustion chamber, and a connection between said fuel regulating member and said control means for movement of the fuel regulating member in the same direction to increase the amount of fuel supplied to the combustion chamber in both forward and reverse operation of the engine as the amount of combustion gases supplied per cycle of operation of the movable work member increases.

HERMANN RIESELER.